Jan. 29, 1963  J. Q. HORNE, JR  3,075,446
APPARATUS FOR JUSTIFYING
Filed May 26, 1959

James Q. Horne, Jr.
INVENTOR.

Jan. 29, 1963   J. Q. HORNE, JR   3,075,446
APPARATUS FOR JUSTIFYING
Filed May 26, 1959   7 Sheets-Sheet 2

James Q. Horne, Jr.
INVENTOR.
BY *Clarence A. O'Brien*
*and Harvey B. Jacobson*
Attorneys Jan. 29, 1963   J. Q. HORNE, JR   3,075,446
APPARATUS FOR JUSTIFYING
Filed May 26, 1959   7 Sheets-Sheet 3

James Q. Horne, Jr.
INVENTOR.

BY
*Lawrence A. O'Brien*
*and Harvey B. Jacobson*
Attorneys

Jan. 29, 1963   J. Q. HORNE, JR   3,075,446
APPARATUS FOR JUSTIFYING
Filed May 26, 1959   7 Sheets-Sheet 4

James Q. Horne, Jr.
INVENTOR.

Jan. 29, 1963 J. Q. HORNE, JR 3,075,446
APPARATUS FOR JUSTIFYING
Filed May 26, 1959 7 Sheets-Sheet 5

James Q. Horne, Jr.
INVENTOR.

BY
Attorneys

Jan. 29, 1963  J. Q. HORNE, JR  3,075,446
APPARATUS FOR JUSTIFYING
Filed May 26, 1959  7 Sheets-Sheet 6

James Q. Horne, Jr. INVENTOR.

Jan. 29, 1963    J. Q. HORNE, JR    3,075,446
APPARATUS FOR JUSTIFYING
Filed May 26, 1959    7 Sheets-Sheet 7

James Q. Horne, Jr.
INVENTOR.

3,075,446
APPARATUS FOR JUSTIFYING
James Q. Horne, Jr., Princeton, N.J.
(Box 3, North Brunswick, N.J.)
Filed May 26, 1959, Ser. No. 815,848
17 Claims. (Cl. 95—85)

This invention comprises a novel and useful frame, apparatus and method for justifying typed or printed matter and more particularly consists of an improvement over the invention disclosed and claimed in my prior copending application Serial No. 310,100, filed September 17, 1952 and which has now matured into Patent No. 2,887,941 on May 26, 1959.

The present invention comprises essentially a means and a method whereby typewritten or other printed material may be justified with a minimum expenditure of time, while maintaining ease of operation and high quality as well as inexpensiveness in the justified product obtained by the invention.

It is therefore the primary object of the invention to provide an apparatus and a method whereby a sheet of typewritten or other printed material from any desired source may with ease and certainty be converted into justified composition.

A further object of the invention is to provide an apparatus and a method whereby a typewritten copy upon a stretchable sheet, whether of a preslit character or one which is subsequently slit after typing, may have the individual strips thereof individually justified in an improved manner and then provided with a non-stretchable backing sheet in order to retain the individual strips in proper relation and in their justified condition.

Another object is to provide a transparent cover sheet for use in conjunction with matter which has been justified whereby to prevent the stretched strips alone or with their backing sheet from curling from the tension in the stretched strips.

Yet another object of the invention is to provide an improved arrangement whereby groups or pages of type-bearing strips may be removed from a common backing sheet and transferred en masse to a relatively rigid holding means to thereby facilitate their successive elongation for justifying purposes.

Still another object is to provide a means and a method to facilitate the establishment of a straight right hand margin to which the typewritten strips may be jusified, and which shall include a tensioned guide wire together with means for readily moving the guide wire into and out of an operative position and in a manner which will not interfere with the various other mechanisms and process steps of this invention.

A still further object is to provide a composite sheet having a stretchable, transparent type receiving sheet strippably mounted upon a relatively stiff removable backing sheet and with means for securing the right margins of said sheets together in a removable but relatively more secure manner than that of the rest of the sheets.

An additional object is to provide a means to facilitate the slitting of type-bearing sheets of a stretchable material between the lines of type thereof whereby to provide strips of typing which may be readily individually stretched for justifying purposes.

It is an important object of the invention to provide both a means and a method for holding the individually stretched and justified strips of typewritten material in a fixed parallel relation to each other when the strips are removed from the backing sheet to the stretching surface and thereafter during tensioning and while the final cover and backing sheets are applied to permanently secure them in their justified relation.

Still another object is to provide a means and a method whereby the backing sheet may be removed from an entire group of typewritten strips which are fixedly secured at their left ends and while retaining their right ends in their original relatively fixed and untangled relation.

A further very important object is to provide an apparatus and method whereby individual typewritten strips of a stretchable material may be singly tensioned, justified and retained in justified position in selective succession.

Another important object is to provide a means and a method for individually removing typewritten strips from their backing sheet, stretching and justifying them and temporarily securing them in justified uniformly spaced positions upon a temporary support; and thereafter transferring the justified strips as a group from the temporary support to their final backing sheet.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 6–11 are detail views in vertical transverse section, parts being broken away, and illustrating successive steps in the process of justifying in accordance with this apparatus and invention and in which:

Disclosed in this application is an apparatus by which stretchable sheets of typewritten or other printed material may be readily justified, this apparatus being illustrated in FIGURES 12–26 of the drawings. In FIGURES 1–5 is a disclosure of the particular construction of the stretchable composite sheets upon which typewritten matter is to be imprinted and which may thereafter be justified in accordance with the invention and by the apparatus of FIGURES 12–26. FIGURES 6–11 disclose certain of the successive steps in the method of justifying matter printed upon the stretchable sheets of FIGURES 1–5 in accordance with this invention and by the apparatus set forth in FIGURES 12–26 herein.

The apparatus, the composite sheets to be justified and the method of justification in accordance with this invention will be dealt with successively in that order in the following description of the invention.

The embodiment illustrated in FIGURES 12–26 is somewhat complex in its nature and in some instances, as will be apparent hereinafter, various of the components described and illustrated in connection therewith may be omitted. As illustrated the apparatus includes as subassemblies thereof and as component organizations therein a support base, a blade and support arm assembly, a stretching assembly, a slitter and a slitter guide assembly. These components of the organization will now be described in detail in the foregoing order.

*1. Support Base of the Apparatus*

Figure 16:
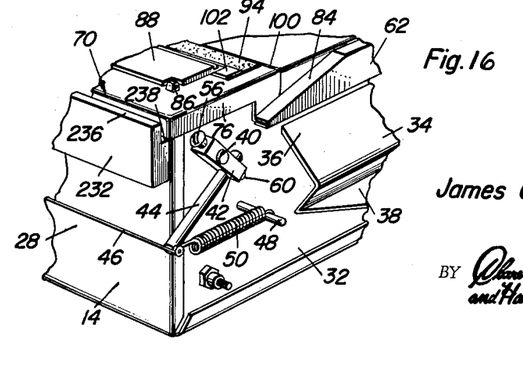
FIGURE 16 is a perspective detail view of the top right corner portion of the device as shown in FIGURE 12 and illustrating in particular the wire guide assembly and a clamp for securing a transparent cover sheet to be placed protectively over the justified material after justification has been effected.
Figure 17:
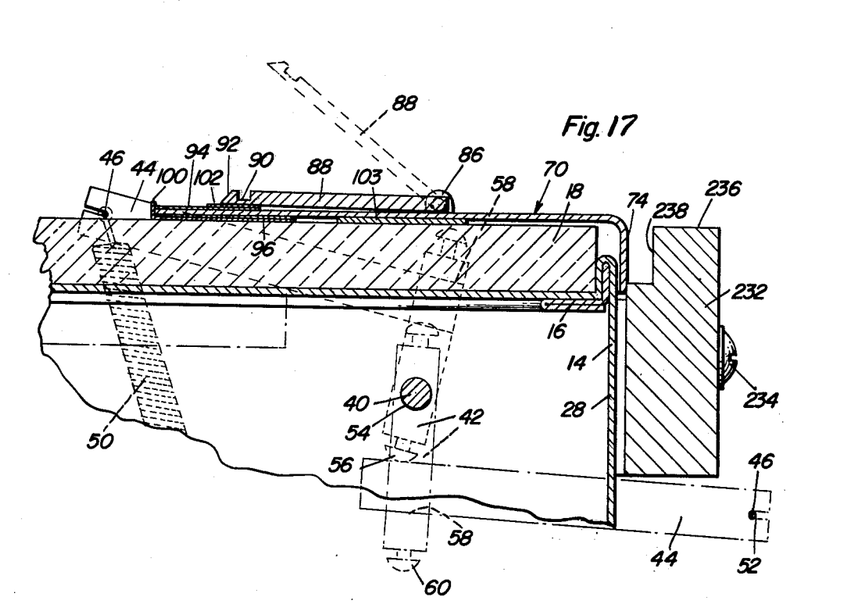
FIGURE 17 is a detail view in vertical transverse section being taken substantially upon an enlarged scale substantially upon the plane indicated by the section line 6—6 of FIGURE 12, certain concealed parts being shown in dotted lines therein and parts being shown in dotted lines in alternative positions.
Figure 18:
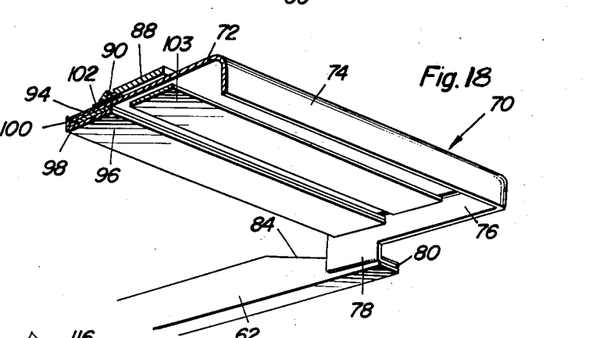
FIGURE 18 is an enlarged detail view in perspective of an end portion of the blade and arm assembly.

The support base component of the apparatus has been illustrated both generally and in detail in FIGURES 12–14, 16 and 17. Preferably it consists of a cabinet or box-like construction comprising a base member 10 to which is secured a box or cabinet designated generally by the numeral 12. The member 12 consists of suitable upstanding side walls 14 which may conveniently be of sheet metal if desired, and which as shown in FIGURE 17 may be provided with inturned flanges as at 16 serving to support a flat top 18 which preferably consists of a transparent or translucent material such as glass having a smooth top surface upon which the material to be justified is placed and supported as set forth hereinafter.

Figure 12:
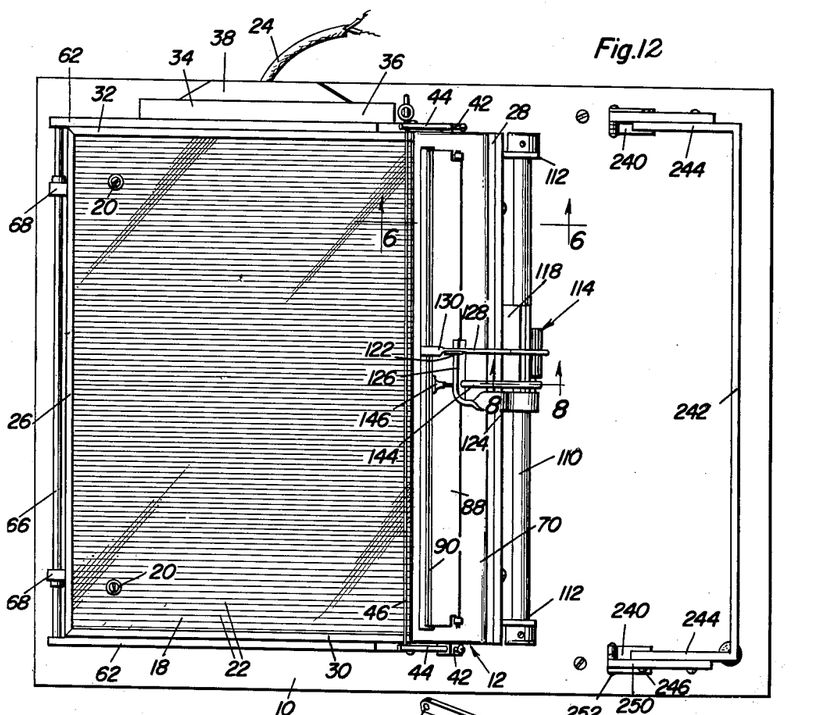
FIGURE 12 is a top plan view of an apparatus in accordance with the principles of this invention.

As suggested in FIGURE 12, the member 18 may be detachably secured in position upon the supporting walls 14 and flanges 16 in a removable manner as by fastening screws 20, and may be provided with guide lines as at 22 which are applied thereto in any desired manner.

Preferably the cabinet or box 12 is in the nature of a light box, having a suitable source of illumination therein, not shown, which may be supplied with current as by the electric conductors shown at 24 in FIGURE 12. As will be observed from the plan view of FIGURE 12, the cabinet or box 12 is located towards one end of the base 10 for a purpose to be subsequently apparent and the other above-mentioned components of this apparatus are mounted upon the cabinet 12 or upon the base member 10 in a manner and for a purpose to be subsequently set forth.

Upon a closer inspection of FIGURES 12, 13, 14, 16 and 17, it will be observed that the cabinet or box walls 14 consist of a pair of end walls 26 and 28 which may be termed outer and inner end walls respectively and a pair of side walls as at 30 and 32.

Referring now to FIGURES 12 and 16, it will be observed that the side wall 32 has secured thereto and mounted thereon a clamp 34. This clamp is resiliently urged by any suitable means, not shown, into a closed position, at which time its jaw or blade 36 will be urged against the side wall 32 adjacent the top of the latter in a position to clamp the edge of a sheet against the side wall and which sheet is utilized as a transparent cover sheet to be applied transversely upon the top surface of the justified sheet as described hereinafter upon the completion of the justifying operation in order to retain the strips of the justified sheet in proper relative position with respect to each other. The clamp includes an angulated portion 38 comprising a handle means by which the clamp may be urged against its closing spring into a releasing position to permit the application of a covering sheet between the blade 36 and the side wall 32 or the removal of the covering sheet from therebetween as desired.

The box or cabinet 12 also includes as a component thereof a guide wire assembly. This consists of a shaft 40 which extends through the cabinet 12, being journaled in the opposite side walls 30 and 32 thereof, in any suitable manner. The end portions of the transverse rod or shaft 40 which extends outwardly of the cabinet 12 have a pair of clamps 42 secured thereto and an arm 44 is in turn secured to each clamp. A guide wire 46 is secured to the outer ends of the two arms 44 in such a manner that upon oscillation of the shaft 40 the arms 44 and the guide wire 46 stretched tautly therebetween may be moved as a rigid unit from its lowered and inoperative position shown in FIGURE 16 to a position in which the guide wire 46 will rest upon the transparent top 18 as shown in FIGURES 12 and 17. In this latter position the guide wire will be disposed at the right hand side or vertical edge of the top 18 in a proper position to form a guide line to which the slits formed in the stretchable typewritten sheet may be justified as set forth hereinafter.

Referring again to FIGURE 16, in particular it will be seen that an anchoring pin 48 is secured to and projects from the side wall 32 and a spring 50 has one end anchored to the pin 48 and its other end secured to an arm 44. The position of the spring is such that it will move over center upon swinging of the arm 44 and will yieldingly retain the arm 44 in either its lowered inoperative position of FIGURE 16 or in its raised and operative position shown in FIGURES 12 and 13.

Referring now especially to FIGURE 17 it will be observed that the arms 44 may conveniently be provided with notches 52 in their outer ends in order to detachably receive the wire guide 46 therein. The dotted line showing in FIGURE 17 illustrates the position of the arm 44 in its inoperative position while the full line showing in FIGURE 17 shows the position of the arm and of the wire guide 46 in the operative position of the latter. As shown in this view it will be observed that the clamp 42, reference also being made to FIGURE 16, has a pair of perpendicular bores extending therethrough. One of these bores, such as the bore 54 receives the shaft 40 therethrough by means of which the clamp is secured to the shaft, a setscrew 56 being provided for this purpose. The other bore 58 is adapted to receive the arm 44 therein, this arm being retained as by the setscrew 60.

It should be noted here that the light box feature incorporated in the apparatus described in the present section is not an indispensable part of the invention, but is included partly as an added convenience, since light boxes or "tracing boards" are used repeatedly in various steps of preparing original material, paste-ups and negatives for producing photo-offset or similar printing plates.

Also, while the illuminated surface of the light box arrangement is helpful in aligning the typed sheet of the present invention, and while the glass surface of the light box is helpful in that it permits the material being justified to be trimmed thereon (or cut free therefrom) with a razor blade or similar instrument—since such cutting edges will not normally penetrate a glass surface at normal pressures—still, any flat relatively rigid surface in proper positional relationship to the other elements of the apparatus described will be found to be perfectly well suited for carrying out the actual justifying operation.

II. Blade and Support Arm Assembly

Figure 15:
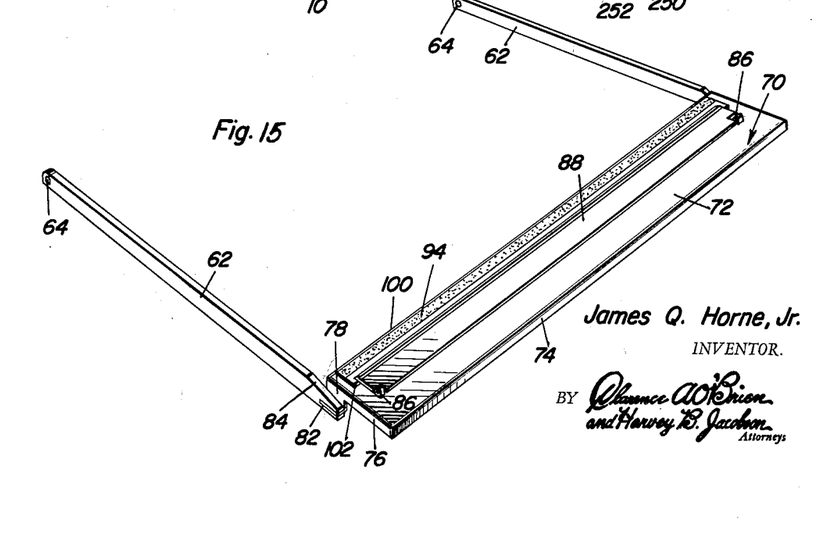
FIGURE 15 is a perspective view of the blade and support arm assembly detached from the apparatus.

The blade and support arm assembly, as shown particularly in FIGURE 15 is of U-shaped configuration comprising a pair of arms each indicated at 62 and which are apertured at what may be termed their inner ends as at 64. These arms are mounted by these apertures upon the extremities of an axle or shaft 66 which in turn is supported by apertured lugs 68 which project laterally from the outer end wall 26 of the box or cabinet 12. At their other ends the arms have fixedly secured thereto a transversely extending blade 70 so that this blade is mounted for vertical swinging movement as will be apparent from a comparison of the full line and dotted line showing in FIGURE 13.

Preferably the blade 70 is of thin sheet metal construction in the interest of light weight and economy although in some instances other materials may be satisfactorily used for the purposes intended and the functions set forth hereinafter. As shown, however, and as will be most readily apparent from FIGURE 18, the blade 70 has a flat plate-like top surface or web 72 which at its outer edge is provided with a downturned flange 74. The opposite ends of the blade have downturned end flanges 76 which at their ends which are remote from the flange 74 are provided with plate-like projections 78 which in turn have laterally outwardly projecting flanges 80 which are received in the end slots 82 of the arm 62, by means of which construction the blade 70 is securely connected to the arms 62. It will be further observed that the top surfaces of the arms 62 at the end portions thereof are beveled or inclined as at 84 and these beveled surfaces, as shown best in FIGURE 13 and as will be apparent from FIGURE 16 are adapted to provide clearances to receive the end portions of the wire guide arms 44 when the wire guide is swung into its operative position shown in FIGURE 2 to thereby enable the wire guide 46 to lie flat upon the surface or top 18.

Upon its top surface, and spaced slightly inwardly from its opposite sides, the blade 70, as will be more readily apparent from FIGURES 16 and 17 is provided with hinges 86 by means of which a guide plate 88 is hingedly mounted thereon. The pivotal mounting of this guide plate is shown in full and dotted lines in FIGURE 17. Adjacent its edge which is remote from its hinged connection to the blade 70, the guide plate 88 is provided with a channel or slot 90 extending across the same and which constitutes a guide for a cutter as set forth hereinafter. The edge of this guide plate 88 is beveled as shown at 92.

Secured to the top surface of the blade 70 and along the edge thereof which is adjacent to the arm 62 is an adhesive coating or tape 94. An L-shaped member having a flat main portion 96 is secured to the underside of the web 72 of the blade 70 as by means of a suitable adhesive 98 or double surfaced adhesive tape therebetween, and is provided with an upstanding end flange 100 which is disposed along the inner edge of the blade 70 and extends slightly above the adhesive surface 94 thereon, as will be apparent from FIGURES 17 and 18. A non-adhesive strip 102, see FIGURE 16, overlies the adhesive coating 94 previously mentioned along the outward edge of the latter and thereby prevents direct contact of the guide plate 88 with such coating.

Secured to the underside of the blade 70 and extending medially and longitudinally thereof is a thin strip 103 of any desired material, of which masking tape is a satisfactory example. The purpose of this strip is to reduce or eliminate any tendency of portions of adhesive material from adhering to the underside of the blade 70. This function of the strip 103 and the functions of the various elements of the blade and support arm assembly will be dealt with more particularly hereinafter.

III. Stretching Assembly

The apparatus also includes a stretching assembly whereby the individual strips of typewritten material may be independently and successively stretched to a justifying position. For a description of the stretching assembly reference is now made primarily to FIGURES 12-14.

The stretching assembly consists of a stationary support or guide rail 110 which is carried by suitable brackets 112 projecting laterally from the inner end wall 28 of the cabinet 12. Mounted upon the guide rail 110, which is preferably in the form of a rod or shaft, is a carriage assembly 114 which is both pivotal upon the guide rail and slidable axially therealong.

The carriage includes a cylindrical body 116 which is journaled upon the rail 110 and to which is fixedly secured an L-shaped support member 118 having mounted thereon a support post 124 provided with a laterally projecting arm 126 by which is pivotally carried a manually operated scissors-like clamp 128. The latter is pivoted in a slot 122 in the upper surface of the arm 126 and is provided with relatively movable jaws 130, see FIGURE 13, which may be manipulated to engage the individual strips of the stretchable sheet of material to securely clamp or hold the same. The pivotal connection of the scissors clamp 128 in the slot 122 and of the lower support member 118 with the rail 110 by means of the cylindrical body 116 will enable the scissors to be drawn towards the right as viewed in FIGURE 13 and thus stretch or lengthen the strips of the stretchable material in order to permit justification of the same.

Figure 19:
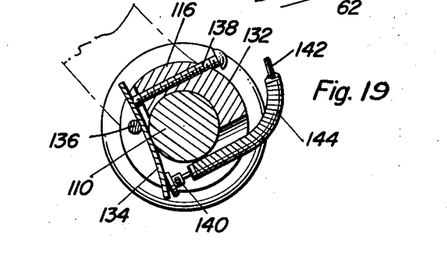
FIGURE 19 is a detail view in vertical section taken substantially upon the plane indicated by the section line 8—8 of FIGURE 12 and upon an enlarged scale and showing the locking means for the stretching assembly carriage.

In some instances, it may be desired to cause the carriage 114 to slide freely along and to rotate or pivot freely upon the guide rail 10. In other instances, however, it may be preferred to provide a lock means whereby the carriage may be locked in selected positions along the guide rail in accordance with the particular strips of material to be justified. For this purpose, there may be provided a manually operated clutch or brake indicated generally by the numeral 132 and which will be normally used to lock the carriage in axially adjusted position upon the guide rail 110 for each acting of justifying. A convenient form of such clutch is shown in FIGURE 19 and may consist of a leaf spring 134 which is fulcrumed across a fulcrum pin 136 carried by the cylindrical member 116 and which has one end adjustably engaged by an adjusting screw 138 whereby to vary the force with which the member 134 bears against the rail 110. At the other end of the member 134 there is provided a pressure foot 140 carried by a flexible shaft 142 received in a flexible housing 144 and by means of which the pressure foot 140 may be caused to engage the member 134 and release or vary the engagement of the latter with the rail 110. An operating button 146 on the other end of this flexible cable is positioned above the arm 126 previously mentioned, as shown in FIGURE 12, to permit ready release of the clutch or brake when shifting the carriage to the next position along the rail for positioning the clamp 128 to grip a strip for stretching and justifying the same.

Figure 13:
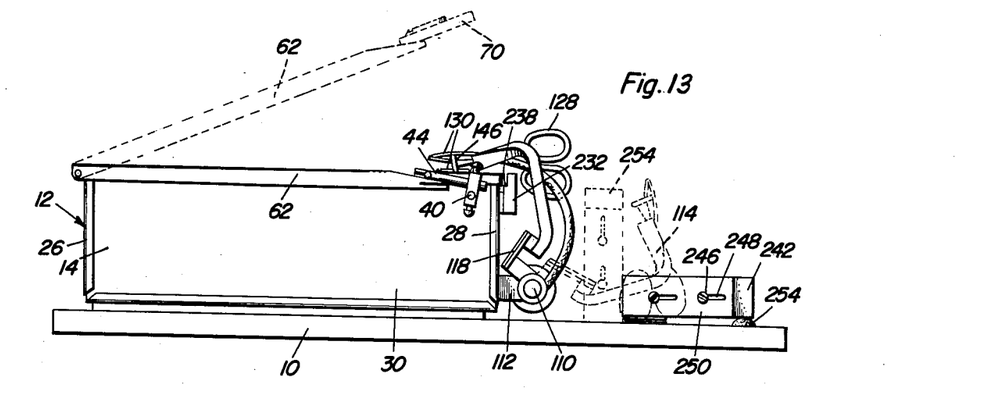
FIGURE 13 is an end elevational view of the apparatus of FIGURE 12, the blade and support arm assembly and the slitter guide support being shown in alternative positions therein in dotted lines.
Figure 14:
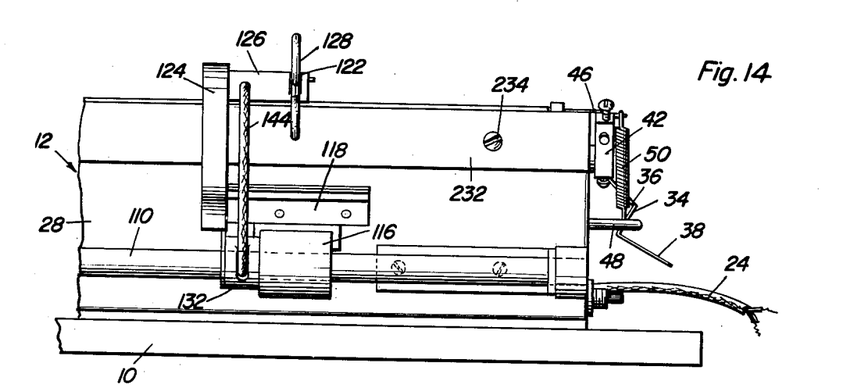
FIGURE 14 is a side elevational view, parts being broken away and taken from the right side of the apparatus as shown in FIGURES 12 and 13 and showing in particular the arrangement of the stretching means of the invention.

It may be here noted that when the device is not in use, the carriage of the clamping means may be folded from its full line position shown in FIGURE 13 to the dotted line position shown therein in order to render the device more compact for storage.

In some instances, it may be desirable to provide a ratchet mechanism whereby a step-by-step axial movement is imparted to the carriage along the rail 110 to automatically advance the carriage and thus enable successive strips of a slitted stretchable typewritten sheet to be stretched and justified.

Figure 23:
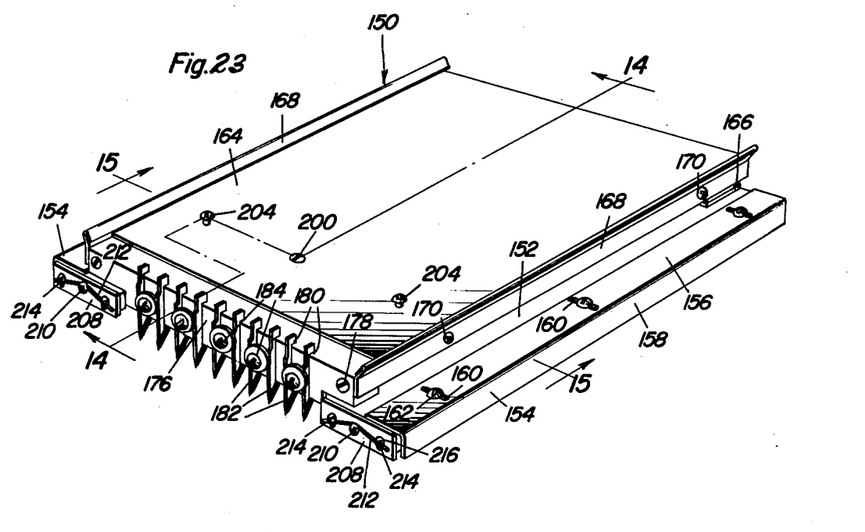
FIGURE 23 is a perspective view of the slitter which cooperates with the slitter guide of FIGURE 20 in order to slit a stretchable sheet of typewritten material which is to be justified.

IV. Slitter

Where a composite sheet or a sheet of stretchable material is employed which is of the unslit type, it is within the scope of this invention to provide a means for effectively slitting the sheet between the lines of typing in order that the individual lines may be separately justified. For that purpose there is provided a slitter shown in FIGURES 23–26. The slitter, indicated generally by the numeral 150, comprises a flat plate 152 which constitutes a base and is of any desired material, having secured to its outer sides a pair of flanged L-shaped guide members each indicated by the numeral 154. The guide members include a horizontal flange 156 together with a vertical flange 158, the horizontal flange overlying the marginal edge portions of the base 152 and being provided with transversely elongated slots 160 therein in which are received fastening screws 162 engaged in the base, as shown in FIGURES 23 and 26, and by means of which the guide members are adjustable laterally with respect to the base. It will be observed that the vertical flanges 158 project downwardly below the bottom surface of the base and they provide a means, as set forth hereinafter, adapted to engage the opposite sides of a guide whereby to mount the slitter for guided movement upon the latter. The screws 162 and slots 160 thus provide a means whereby the guide members 154 may be laterally adjusted to accommodate themselves to a particular size of a guide assembly, and to align knives in slots.

Mounted upon the top surface of the base 152 is a carriage 164 which is of substantially the same length as the base but is of a slightly lesser width. At its rear end the carriage is hingedly secured to the rear edge of the top surface of the base 152 as by a piano-type of hinge 166; see in particular FIGURE 25. A pair of side strips 168 are secured as by fastening screws 170 to the side edges of the carriage 164 and project upwardly and outwardly with respect thereto to provide finger grip rails by which the slitter may be manipulated.

Figure 24:
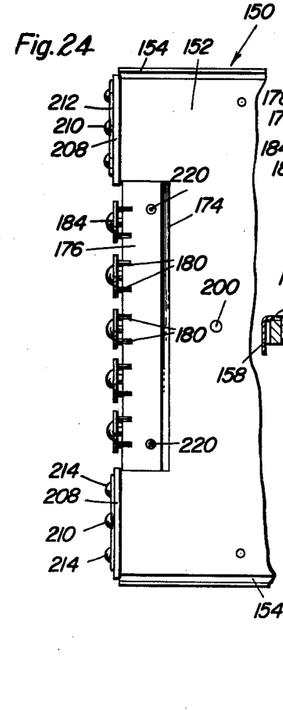
FIGURE 24 is a detail in bottom plan of the cutter end of the slitter of FIGURE 23.

As will be most readily apparent from FIGURE 24, the front edge of the base 152 inwardly from its side edges is provided with a rearwardly projecting cutaway portion or notch 172. Movably disposed in the notch 172 of the base 152 and secured to the vertical front surface of the carriage 164 is a mounting bar 176 which is removably retained as by the fastening screws 178. The mounting bar in turn is provided with a plurality of vertically extending slots 180 in which are disposed a plurality of vertically extending slitting blades or knives 182, which are removably secured in the slots as by headed fasteners 184, each fastener securing a pair of blades in position as will be readily apparent from a comparison of FIGURES 23 and 24. The blades have their lower edges provided with sharp cutting surfaces which project slightly below the base 152. These knives thus project below the bottom surface of the base so that when the base is moved longitudinally, the properly positioned knives will act as gang cutters and make a plurality of slits appropriately spaced to thereby sever the sheet over which the device is drawn into a plurality of strips.

It will be observed that by means of the fasteners 184, the sets of blades or knives 182 may be vertically adjusted to cause the same to project a desired distance below the carriage 164 upon which they are directly mounted and below the base 152 upon which the carriage in turn is mounted. The fasteners thus provide a means for individually adjusting the depth or positioning of the individual knives or blades, and a means to be now described is provided for simultaneously adjusting the tilting of the carriage with respect to the base and thus simultaneously adjusting the depth of all of the knives or blades mounted upon the mounting bar 176.

Figure 25:
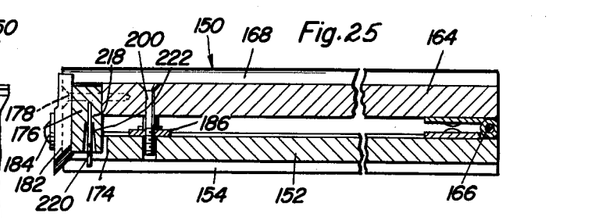
FIGURE 25 is a vertical longitudinal sectional view taken substantially upon the plane indicated by the broken section line 14—14 of FIGURE 23 and showing in particular the resilient stop pin construction, the removable gang cutter assembly, the base and cutter assembly support of the slitter.
Figure 26:
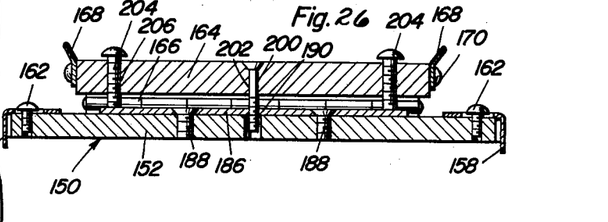
FIGURE 26 is a vertical transverse sectional view taken substantially upon the plane indicated by the section line 15—15 of FIGURE 23.

For an understanding of this adjusting means whereby the carriage itself is adjusted vertically, attention is now directed specifically to FIGURE 23 in conjunction with the detailed views of FIGURES 25 and 26. At the forward end of the carriage, that is at the edge which carries the mounting bar and the knives and which is remote from the hinge 166 of the carriage on the base, there is provided means for both limiting the downward swinging of the carriage with respect to the base and for retaining the carriage against swinging movement away from the base.

These means include a metal anchor strip 186, see FIGURES 25 and 26, which extends transversely of and upon the top surface of the base, being secured thereto as by fastening screws 188. This strip has a threaded aperture 190 therethrough, see FIGURES 25 and 26, in which is adjustably secured an anchor screw 200 passing through a bore 202 in the carriage. It will be evident that by adjusting the screw 200, the front end of the carriage may be pulled downwardly with respect to the base, the screw 200 thus serving to anchor or retain the carriage against upward tilting with respect to the base.

Upon opposite sides of the anchor screw 200 there are provided a pair of stop screws 204, which are threadedly engaged in bores 206 in the carriage and which abut against the upper surface of the anchor strip 186. It will thus be seen that the stop screws 204 adjustably limit downward movement of the front end of the carriage with respect to the base and thus in turn limit the penetration or depth of adjustment of the knives 182 of the mounting bar.

By properly adjusting the anchor screw 200 and the stop screws 204 it is evident that any desired depth of penetration may be given to the gang assembly of knives carried by the mounting bar 176; while individual adjustment of such knives can be readily effected by the headed fasteners 184 as previously described.

The slitter also includes a resilient support means mounted at the front end of the base and which yieldingly holds the base, the carriage and the gang assembly of knives carried thereby above the surface upon which the slitter rests until such time as the slitter is depressed downwardly by the weight of the hand of the user to cause the knives to penetrate or engage the surface to be slit thereby. This resilient means includes, as will be best apparent from FIGURE 23, the pair of resilient support plates 208 disposed at the opposite side edges of and at the front edge of the base.

Each of the resilient support plates 208 has at its midportion and projecting forwardly therefrom a fulcrum pin 210 which is rigidly carried thereby and a spring 212 has its midportion resting upon and passing across the top of the fulcrum pin 210 and has its end portions received beneath a pair of screws 214, each of which passes through the vertically elongated slots 216 in the resilient support plates 208 and is secured into the forward edge of the base 152. The arrangement is such that the springs 212 being flexed downwardly across the fulcrum pin 210, and engaged underneath the screws or pins 214 carried by the base, yieldingly urge and press the support plates 208 downwardly to the full extent permitted by the engagement of the vertical slots 216 upon the pins 214. This arrangement of movement is such that when the support plates are pressed to their lower position, their lower edges will maintain the points of the gang knives 182 sufficiently elevated so that these knives will be raised above and out of contact with the surface to be slit by the device. However, when the user presses downwardly upon the carriage which is gripped in the hand by the side strips or rails 168, the springs 212 will be caused to yield, thereby permitting the base itself to move downwardly allowing the knives 182 to penetrate the surface to be slit.

Advantages of this construction are that the slitter may be safely laid upon a surface and the resilient support plates 208 will raise the blades out of contact with the surface to thereby prevent marring such a surface until such time as is desired to use the device for slitting the surface and permits ready shifting of the guide assembly, to be hereinafter described, with the slitter thereon, over the surface to be slit.

Referring now to FIGURE 25 it will be observed that the underside of the mounting bar 176 is provided with a pair of upwardly extending vertical bores 218 therein, which bores at the lower end are outwardly enlarged or divergent to form the counterbores 220. A resilient stiff wire-like stop member 222 is secured at its upper end in the upper portion of the bore 218, and its lower end passes through the enlarged counterbore 220 and projects below the bottom surface of the base 152. Preferably each of the resilient stops 222 is disposed in alignment with one of the knife edges 182. The arrangement is such that as the slitter is drawn along a guide means to be later set forth in order that the plurality of knives may make the corresponding slits in the sheet to be justified, the resilient wire stops 222 will engage the ends of an opening or slot in the guide means and thus resiliently cushion the stopping of the stroke of the slitter to thereby prevent damage to the knife assembly thereof. The function of these resilient stops 222 will be more particularly brought out in connection with the guide assembly to be used with the slitter.

*V. Slitter Guide Assembly*

In order to guide and facilitate the use of the gang cutter or knife assembly which constitutes the slitter, just described, and in order to facilitate proper registration of the knives with the lines of typewritten material to be slit, there is provided a detachable slitter guide assembly to be now described. The slitter guide assembly consists of a guide template or frame designated generally by the numeral 230 which is readily detachably mounted upon the associated support structure carried by the base 10 and by the cabinet 12.

Referring first to FIGURES 12, 13, 16 and 17, it will be observed that the end wall 28 of the casing or cabinet 12 has secured thereto a horizontally extending guide bar 232 secured as by fastening screws 234. At its upper edge the bar 232 has a flat level horizontal surface 236 together with a transversely or longitudinally extending channel or recess 238 disposed between the bar and the adjacent face of the wall 28 of the cabinet or housing.

Referring now to FIGURE 12 it will be observed that the base 10 and its right end portion has mounted thereon a pair of brackets 240 to which is pivotally secured a transversely extending movable support bar 242. The latter at its opposite ends has a pair of perpendicular legs 244 which are adjustably secured as by screws 246 and elongated slots 248 to connecting bars 250, the latter being pivoted at 252 to the above-mentioned mounting brackets 240.

The arrangement is such that the legs 244 of the bar 242 may be longitudinally adjusted with respect to connector legs or links 250, the fasteners 246 being screw-threadedly engaged in bores in the legs 244 and being slidable in the elongated slots 248. Thus, the height of the bar 242 with respect to the base 10 and therefore with respect to the top surface of the stationary horizontal guide bar 232 and its top surface 236 may be regulated and adjusted.

Shown in FIGURE 13 in full lines is the movable bar 242 in its position folded back out of the way down upon the base, it being seen that it rests upon a cushion or support member 254 as shown in FIGURE 13; or in dotted lines is shown the bar in its raised operative position.

Figure 20:
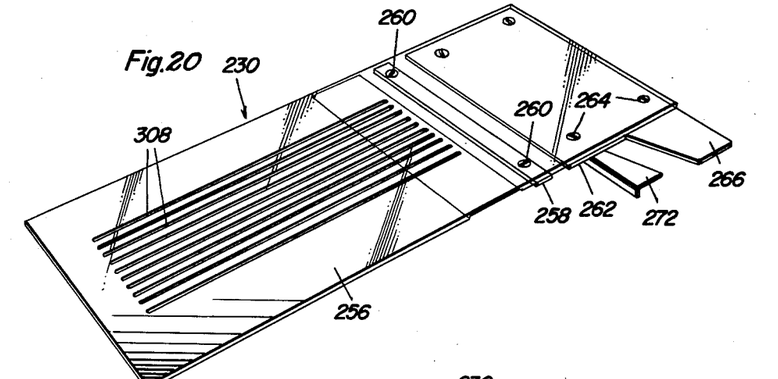
FIGURE 20 is a perspective view of the slitter guide which may be employed when a stretchable non-slit typewritten sheet is to be justified.
Figure 21:
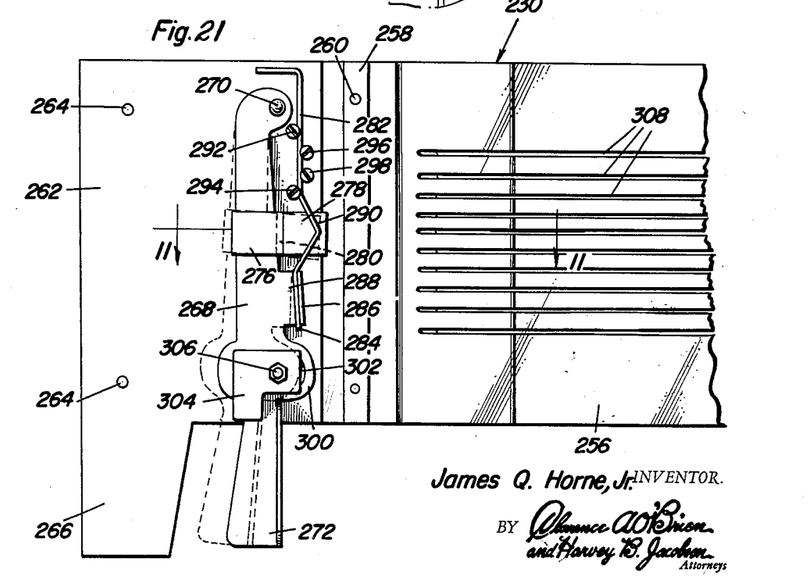
FIGURE 21 is a fragmentary bottom plan view, upon an enlarged scale, of the right end of the slitter guide, an alternative position of the latch being shown in dotted lines therein.
Figure 22:
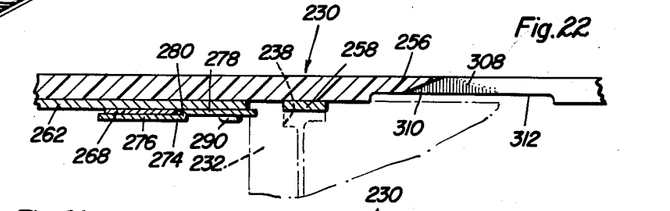
FIGURE 22 is a detail view in vertical longitudinal section, taken substantially upon the plane of the section line 11—11 of FIGURE 21.

Detachably engaged upon the fixed guide bar 232 and cooperating with the latter and the movable support bar 242 is the guide template or frame 230 previously mentioned. Referring now to FIGURES 20–22 it will be observed that this slitter guide consists of a flat thin sheet 256 of a transparent material and which constitutes a guide blade. The blade is adapted to extend transversely across the top wall 18 of the box or cabinet when the blade assembly is in its operative position, and adjacent the right end of the blade and secured to the underside thereof is a metallic strip 258, secured as by fastening screws 260, and which constitutes a slide member of sufficient width to enable it to be slidably received in the channel 238 previously mentioned of the fixed guide bar 232. In order to retain the slide in adjusted position in this channel or on the guide bar there is provided a latch assembly which is adapted to releasably exert a frictional resilient gripping action upon the other side of the guide bar. For this purpose there is secured to the underside of the guide template or frame 230 a latch mounting plate 262 which is secured as by fastening screws 264. This plate has a lateral projection 266 at one side thereof which acts as a handle in positioning the template and also in operating the latch means.

The flat plate-like latch lever 268 is pivoted as at 270 to the latch mounting plate 262, at one end of the latch lever, and the lever has a projecting portion as at 272 comprising the handle for manipulating the same. It will be observed that the handle 272 is disposed in substantially parallel relation to the handle portion 266 of the latch mounting plate as shown in FIGURES 20 and 21.

A roughly Z-shaped latch finger 274 engages and cooperates with the latch lever 268. For this purpose the finger 274 has a flat horizontal portion 276 which underlies and is fixedly secured to the latch lever together with a flat laterally offset horizontal portion 278 which slides against the bottom surface of the latch mounting plate and is connected by a vertical flange 280 to the portion 276. The arrangement is such that the edge of the latch lever 268 will engage the flange 280 so that upon movement of the latch lever in one direction it will urge the latch finger toward the slide 258. Thus, when the slide 258 is disposed in the recess or channel 238, the latch finger in turn will engage the opposite outer face of the guide bar 232 to resiliently clamp the mounting plate between the latch finger and the slide.

A spring means is provided cooperating with the latch lever and the finger. This spring means consists of a wire-like member 282 having one end portion 284 anchored in a sleeve or retainer portion 286 formed in or carried by a laterally projecting portion 288 of the latch lever. The midportion of the spring is of V-shaped configuration as at 290 and bears against the bottom surface of the horizontal portion or flange 278 of the latch finger to retain the spring flat against the latch mounting plate 262, the latch lever 268 and latch finger 274 as will be apparent from a comparison of FIGURES 21 and 22. The other end portion of the spring is secured to the mounting plate by a plurality of combined fasteners and adjusting screws. Thus, on one side of the spring there are provided a pair of fasteners and adjusting screws 292 and 294 while a corresponding pair of adjusting screws 296 and 298 are disposed on the other side of the spring and between the two screws 292 and 294.

Any one or all of these fasteners and adjusting screws 292, 294, 296 and 298 may be provided with conical enlargements between their shanks and heads, or with eccentric portions so that as the screws are moved downwardly or are rotated they will impart various lateral forces to the spring 282 to thus initially and variably tension the latter. Thus these fasteners not only serve to anchor the spring firmly to the latch mounting plate 262, but they also serve to adjust the force and tension of the spring upon the latch lever, whereby the latter in turn will apply its force to the latch finger. It will thus be apparent that if the fasteners 292, 294 are employed as fixed fulcrums, the fasteners 296 and 298 may be adjusted to variably flex the end 284 of the wire spring towards the right as viewed in FIGURE 21 and thus increase the spring force applied to the latch lever 268 and by the latter to the latch finger and thereby increase the clamping action of the latch and the slide 258 upon the fixed guide bar 232. Alternatively, proper adjustment of these fasteners will reduce the force of the resilient clamping action. The four fasteners thus provide a variety of very fine adjustments as to the spring tension and pressure in accordance with the individual settings of the fasteners.

It will of course be apparent that in some instances I may prefer to eliminate the adjustability of the spring means and may employ simply a spring means of a fixed preset force to actuate the latch lever.

It will be further observed from FIGURE 21 that the latch lever includes a laterally circular enlarged portion as at 300 having an opening 302 therein and a retainer plate 304 is secured as by a fastening bolt 306. It will be observed that the retainer plate overlies the enlarged circular portion 300 of the latch lever and thus retains this end of the latch lever against the mounting plate, it being noted the other end of the latch lever is retained by the previously mentioned pivot 270. The bolt 306 not only serves to secure the retaining plates 304 in position, but extends through the opening 302 of the latch lever and acts as a stop limiting pivotal movement of the latch lever in either direction.

Referring now again to the blade portion 256 of the slitter, it will be observed that there are provided a plurality of parallel slots 308 therein. At their opposite ends these slots are provided with inclined end walls as at 310 and the slots are undercut across the width of the blade on the underside thereof as at 312, as shown particularly in FIGURE 22. The slots are spaced from each other by a distance which corresponds to that of the spacing of a line of typewritten material upon a sheet to be justified, this also being the spacing of the set of knives 182 of the slitter. Consequently, when the template is placed in proper position with the slide 258 thereof disposed in the recess or channel 238 of the fixed mounting bar 232, and with the latch lever mounting plate 264 being slidable upon the top surface of the movable support bar 242, the guide slots 308 of the blade of the template may be disposed properly with respect to the typewritten material. The transparent material of the blade facilitates the proper positioning of the blade for this purpose. Thereafter, the slitter may then be placed upon the guide assembly, in such a manner that the previously mentioned guide members 154 of the base of the slitter will embrace the side edges of the blade 256 for sliding movement therealong. When now the carriage is pressed downwardly of the hand of a user, the resilient plates 208 will yield and permit the gang knives to pass through the guide slots and penetrate the material of the sheet to be slit. With the slitter being moved from the left to the right of the guide as viewed in FIGURE 20, the gang knives will slit the sheet of material to the desired depth to which they are adjusted. As the knives reach the right end of the slots, the resilient stops 222 will abut against the inclined edges of the end wall 310 of the slot 308 and thus resiliently limit the travel of the slitter.

It will be understood that the blade 256 may be of any desired width so that any desired number of guide slots 308 may be provided therein. In some instances, this blade may extend across substantially the entire vertical extent of a sheet of material to be slitted. It is preferred however in the interest of ease of handling the slitter, to provide a sufficient number of slots to effect slitting a portion only of the sheet of typewritten material to be justified, it being understood that the blade then will be moved from position to position along this sheet to complete the slitting operation throughout the entire length of the sheet of material. Further, although it is thought to be more satisfactory in some instances to provide the same number of slots 308 as there are knives in the gang assembly of knives carried by the mounting bar 176 of the slitter, it is evident that an increased number of slots may be provided in some instances.

It will be understood that either the action of the guide members 154 on the edges of the guide blade 256 or the position of the knife blades 182 in the slots 308, or both, may be relied upon to maintain the blades in proper position for their slitting operation.

Where the action of the guide members 154 alone is desired, the slots 308 could be omitted and the blade 256 provided with an elongated opening through which the gang assembly of knives is operable.

An important advantage of the slotted transparent blade 256 is that it facilitates locating of the slots relative to typewritten material wherein the lines thereof are slightly out of parallelism, as when the sheet slips on the platen of the typewriter. The visibility of the typewritten lines through the transparent blade enables the user to simultaneously perceive the printed lines and the space therebetween in which the slits are to be made whereby the slots can be quickly shifted to a position medially of the lines.

VI. Composite Sheet To Be Justified

In the preceding portion of the specification there has been described a construction of an apparatus for effecting justification of typewritten or printed matter upon a sheet of stretchable material or a composite sheet which includes therein a stretchable sheet containing the material to be justified. Reference is now made to FIGURES 1–5 for an understanding of the composite sheet constructions which are particularly applicable for use with the apparatus above described and in accordance with the method of justification hereafter set forth and in accordance with the principles of this invention.

Reference is made first to FIGURES 1, 3–5 for an understanding of the composite sheet containing a sheet of stretchable material for typewritten matter which is to be justified in accordance with this invention.

Figure 1:
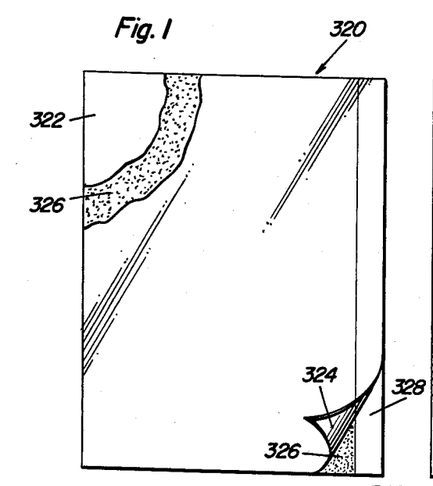
FIGURE 1 is a plan view, parts being broken away of a composite unslit sheet upon which the typewritten material is to be imprinted and showing differential adhesive areas thereof.

Indicated generally by the numeral 320 in FIGURE 1 is a first form of a composite sheet. This composite sheet includes a relatively non-stretchable backing sheet 322 of a relatively non-stretchable material of low cost which can be readily discarded once the transparent stretchable sheet 324 has been stripped therefrom. A coating of an adhesive material as at 326 serves to bond temporarily in a strippable manner the top stretchable sheet 324 to the backing sheet 322. This adhesive material may be of any suitable type and may be permanently associated with the backing sheet 322. Preferably, however, at the right hand margin of the backing sheet, there is provided an adhesive coating or material 328 which is of a relatively greater strength and is a stronger adhesive than the main body of the coating 326. Thus, while the main portion of the transparent stretchable sheet is secured by a readily frangible bond such as that provided by a suitable strippable cement 326 to the main portion of the backing sheet 322, the marginal portions of the elements are more strongly and fixedly secured together by the adhesive material 328 of a greater strength than that of the adhesive material 326. The purpose of this differential adhesive effect for securing the backing and the stretchable sheets together will be clearly apparent from the description of the method or process in accordance with this invention hereinafter.

The stretchable sheet 324 may be of any suitable material which will possess the characteristics of clearly taking typing and permitting erasures and corrections in typing thereon, and which is preferably transparent in order that guide lines may be viewed therebeneath. A thin vinyl film of the character and type referred to in my prior co-pending application Serial No. 310,100, filed September 17, 1952 and which is now matured into Patent No. 2,887,941 of May 26, 1959 is especially suitable for this purpose.

The stretchable sheet and the backing sheet are so proportioned with regard to their relative thickness and compressibility as to produce a combined sheet having a precisely controlled amount of "give" so as to insure a good, firm and uniform engagement with the type surfaces, but not to allow sufficient digging-in of the type as to dull the outline of the type impressions. It is quite important, in this connection, that the stretchable material should not be overly thick, since this would automatically render the combined type-sheet too compressible. (In the case of most stretchable films, the top limit of film thickness for satisfactory use with the present process is about .003 or .004 inch.) Also, the adhesive or other bonding means used to strippably join the main portions of the stretchable and non-stretchable sheets which make up the composite sheet should not be too compressible. It should also be continuous over the entire typing area, since any non-bonded areas will be less stable than the bonded ones and will tend to cushion the type impact.

Generally speaking, relatively dry adhesives, rather than the non-drying, tacky (or pressure-sensitive) type are preferable in fabricating composite sheets of the kind in question, since the latter tend to be too soft to be compatible with clear type impressions, although such adhesives could conceivably be used if they were applied in coats sufficiently thin as to minimize their cushioning effect, and if they were allowed to "cure" for a sufficient length of time to allow the solvents which such adhesives usually contain to evaporate completely before the stretchable and non-stretchable sheets were laminated together. Otherwise, gas bubbles created by evaporated solvent under the stretchable sheet will mar the typing qualities of the composite sheet.

In fabricating composite sheets of the present type using adhesives which "dry" to a relatively hard consistency, it will be noted that most such adhesives are usually obtained and/or utilized in a fairly free-flowing liquid state and are either thinned with relatively volatile solvents or with water. In the case of "hard" adhesives thinned with volatile solvents, one of the same troubles mentioned above with pressure-sensitive adhesives, i.e. gas bubbles or blisters under the stretchable film, is encountered. And in the case of water-thinned adhesives, excessive warping and curling of the composite sheet occurs, due to the different absorptive characteristics of the stretchable and non-stretchable sheets. For these reasons, it has been found that the most practical type of adhesive for use in laminating composite sheets of the kind presently described appears to be a highly viscous material preferably containing a slight amount of plasticiser (or seize) which is thinned with relatively small quantities of non-volatile drying oil, so that the adhesive is capable of drying to a firm but non-brittle state due to absorption of the relatively unsolidifiable components of the drying oil by the relatively porous backing sheet of the preferred embodiment of the present composite sheet. Such material is well-known in the printing art and has been used successfully in fabricating composite sheets of the present type. It has a consistency very close to that of printer's ink but is fully transparent (although slightly amber-colored) and is designed to cover printed matter (such as the guide lines of the present composite sheet) but not to obscure it.

In use, the entire composite sheet 320 as shown in FIGURE 1 is inserted in the typewriter and employed in the customary manner. After the typewritten text has been completed, the composite sheet is removed and is then justified as by means of an apparatus set forth hereinbefore and in accordance with the method to be described hereinafter. During this justifying process, the transparent sheet 324 having the typewritten matter thereon is stripped from the backing sheet 322 and in a slitted condition is then justified.

In the form of composite sheets shown in FIGURE 1, the transparent sheet is unslit, being subsequently slit by the slitter means referred to hereinbefore.

Figure 4:
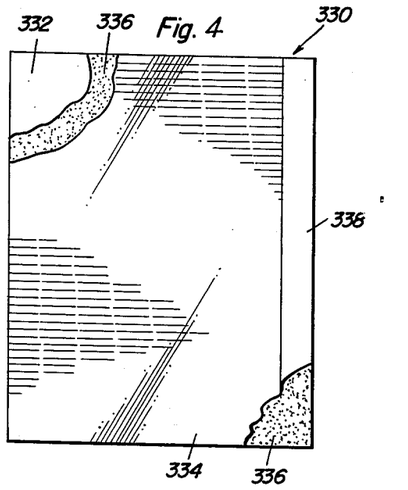
FIGURE 4 is a plan view of the composite sheet of FIGURE 1 but in a preslit condition and having a strip of tape along a right hand edge in place of the differential adhesive area of FIGURE 1.

Referring next to FIGURE 4 it will be observed that a somewhat modified construction of a composite sheet 330 is illustrated. In this form there is provided a backing sheet 332 similar to the backing sheet 322 together with a transparent stretchable sheet 334 which may be identical with or similar to the transparent sheet 324 of FIGURE 1. Similarly, a coating of a readily strippable adhesive material as at 336 is interposed between the backing sheet and the stretchable sheet to temporarily secure these elements together. However, in place of the marginal coating of adhesive material 328 which is relatively stronger than that of the main portion of the material 326, the marginal portions of the backing sheet and of the stretchable sheet are secured together along their right marginal edges as by binding tape 338, sewing or the like.

Although FIGURES 1 and 4 illustrate unslitted stretchable sheets for receiving typewritten impressions, it will be understood that in some instances it may be preferred to have the sheets 324 or 334 pre-slit or scored along slit lines between the lines of typewritten material to facilitate its separation to form strips each of which contains a line of typewritten material to be justified.

Figure 3:
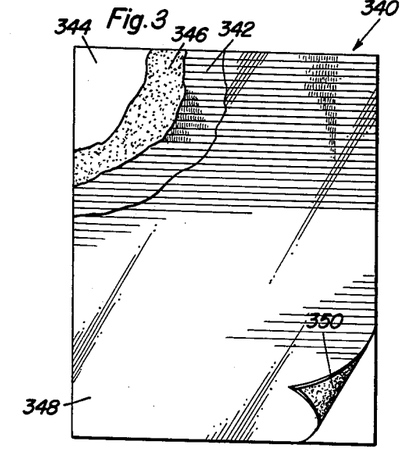
FIGURE 3 is a plan view, parts being broken away, of the article produced from the composite sheet of FIGURE 1 after the latter has received imprinted material thereon, has been slit, its original backing sheet removed, has been justified and the transparent cover sheet and the final backing sheets have been applied.

Referring next to FIGURE 3, there is seen in plan view a representation of the complete justified sheet in its final form. This final sheet comprises a transparent stretchable sheet 342 consisting of justified strips previously referred to. These strips are either those of a pre-slit stretchable sheet or resulting from the non-pre-slit stretchable sheets 324 and 334 previously mentioned and which have been subsequently slit prior to their justification in the apparatus as set forth hereinbefore. The justified strips 342 are secured to a final backing sheet 344 having an adhesive coating 346 thereon. After or before the justified strips 342 are secured to this backing sheet, a transparent final cover sheet 348 having an adhesive coating 350 thereon is secured to the top face of the justified sheet of strips 342 so that the justified strips are now firmly held between the relatively stiff backing sheet and a transparent cover sheet. Thereafter the composite justified sheet is then trimmed to the desired size and is then ready for use as a means from which copies may be made in various well known methods.

Figure 5:
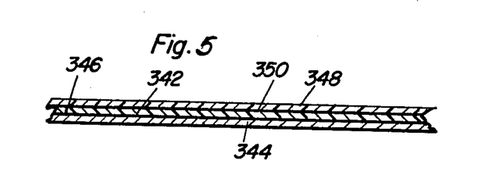
FIGURE 5 is a detail view in vertical transverse section, parts being broken away, through the sheet of FIGURE 3.

FIGURE 5 shows in vertical section in exaggerated form the final association of the final backing sheet 344, its adhesive coating 346, the sheet of justified strips 342, the transparent final cover sheet 348 and the adhesive coating 350 therebeneath.

Figure 2:
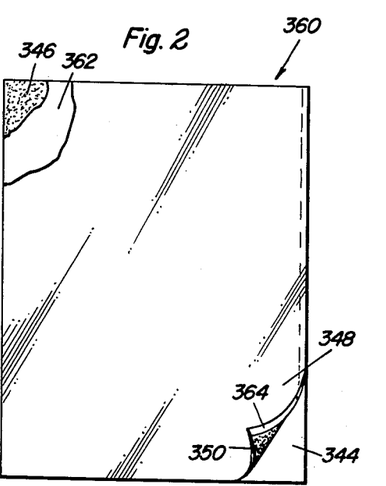
FIGURE 2 is a plan view of a three piece unit for conveniently supplying the adhesively coated transparent cover sheet and the backing sheet for the justified sheet.

As a convenient manner for supplying the necessary final cover sheet 348 and final backing sheet 344, each having an adhesive coating thereto, a three piece unit in the form of a composite sheet is shown in FIGURE 2 and designated generally by the numeral 360. This unit consists of a previously mentioned final backing sheet 344 with its adhesive coating 346 thereon, a strippable intermediate or separator sheet 362 and the previously mentioned top transparent sheet 348 with its adhesive coating 350. In order to facilitate the stripping of the final cover sheet 348 and the final backing sheet 344 which are to be used in forming the justified composite sheet 340 of FIGURE 3, from the disposable intermediate or spacer sheet 362, it is preferred to form along the right marginal edges of the final transparent cover sheet 348 and of the final backing sheet 346 a relatively narrow selvage as the strip or zone 364 from which the adhesive material 346 or 350 has been omitted to facilitate the starting of the stripping operation of the cover sheet and backing sheet from the intermediate sheet.

It will be understood that the right hand selvage or marginal portion may consist of a continuous strip along the entire marginal length of either one or both of the backing sheet and cover sheet from which the adhesive has been omitted; or a corresponding portion of the surfaces of the intermediate sheet 362 may be so treated as to prevent adherence of the adhesive thereto along this region; or selected portions along the margins or at the corners of the strippable final cover and backing sheets may be so prepared as to prevent adhesion of the intermediate spacer sheet therewith.

VII. Method of Justifying

Generally speaking, this method comprises attaching the left-hand edge of a typed sheet of the prescribed laminated material to the main supporting surface of the apparatus described in Section I, above. Then, after steps have been taken to see that the top, stretchable layer of the typed sheet has been cut into strips corresponding to lines of type, the backing is removed from the stretchable material—starting at the left-hand edge—and the stretchable strips are transferred as a unit with their right-hand extremities being placed upon a strip of tacky adhesive supported by a vertically-movable plate which extends along the right-hand edge of the supporting surface. The line strips are then stretched with the aid of the stretching assembly described in Section III, above, and the right-hand ends of the printed lines are brought into straight vertical alignment by means of a guidewire. As each line is stretched the necessary amount, it is reaffixed to the strip of tacky adhesive. When all of the strips on a sheet have been thus justified, they are permanently locked into position by applying a transparent sheet of adhesive, relatively-incompressible material to their top surface. The plate supporting the right-hand ends of the justified strips is then raised and another sheet of relatively incompressible material (not necessarily transparent) is slipped under the raised line strips, sticky-side-up. The strips, together with their transparent cover sheet, are then lowered down onto the upturned adhesive sheet and are pressed into contact with it. The effect of this added second sheet is to completely enclose the stretched line strips so that they form the middle layer of a glued-together sandwich. This arrangement prevents curling of the justified material (due to tension in the stretched line strips) when it has been removed from the stretching surface. Justified material prepared in this way may then be trimmed as necessary and incorporated into a paste-up of a larger page. Naturally, when only one typed sheet is to be reproduced at a time, the justified strips may be photographed while they are still on the stretching surface, and the addition of the two adhesive sandwiching sheets of the above described sandwiching operation is then unnecessary. It is still helpful, however, to apply a transparent cover sheet to the stretched line strips even in this case, since such a sheet is highly effective in helping to conceal the slits between the stretched strips and therefore gives the photographer more leeway in developing the plate or negative in such a way as to bring out maximum clarity in the printed matter.

In order to follow through the present justifying method in detail now, reference is made particularly to FIGURES 6–11.

Assuming that a composite sheet 320 or 330 as in FIGURES 1 or 4, either unslit or pre-slit, has had imprinted thereon typewritten material to be justified, the steps in the process of justifying are as follows:

Step one consists of positioning the typewritten composite sheet upon the preferably transparent top surface 18 of the cabinet or light box 12. The numeral 370 of FIGURE 6 designates the typewritten composite sheet disposed upon the top surface 18, a strip of adhesive tape 372 being provided to affix the left margin of the composite sheet directly to the surface 18. During this step of the method the guide lines 22 and/or any other suitable means can be provided to assist in properly positioning the composite sheet 370 in place. The sheet is preferably so positioned that its right hand margin will overlap the blade 70 when the latter is resting upon the top surface of the light box.

Figure 6:
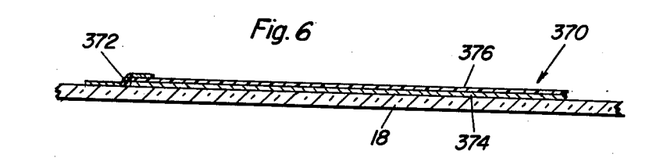
FIGURE 6 shows the composite sheet of FIGURES 1 or 4 secured to the supporting surface and in readiness for slitting or removing of the original backing sheet respectively.

It will be observed that in this position shown in FIGURE 6 the backing sheet 322 or 332 of FIGURE 1 or 4 and shown at 374 is positioned in direct contact with the surface 18, the typewritten stretchable sheet being indicated at 376.

The second step of the process consists in lowering the blade 70 on the right edge or margin of the sheet as shown in FIGURE 6.

The third step of the method consists in positioning the margin line guide wire 46 so that the same overlies the right portion of the composite sheet.

The fourth step consists in shifting the sheet upon the surface to cause the line guide wire to register with and locate the right margin to which the lines of the printed matter are to be justified. For this purpose the composite sheet may be shifted upon the stretching surface 18 under the blade and the guide wire.

The fifth step consists in securing, as by taping or otherwise, the left margin of the sheet 370 to the surface 18, this being the position indicated in FIGURE 6.

As the sixth step, the guide wire is now removed and the blade 70 is likewise swung out of position exposing the right hand margin of the composite sheet.

As the seventh step, the slitter guide 230 of FIGURE 20 is now mounted upon its support means and overlies the composite sheet in position for slitting the same, it being assumed at this point that the composite sheet 370 is of the unslit type.

As the eighth step, the slitter 150 of FIGURE 23 is now operated in conjunction with the slitter guide 230 to slit the stretchable sheet member 376 of the composite typewritten sheet 370, this operation being continued until all of the typewritten lines thereof are on separate strips of material lying between these slits. The slitting operation starts close to the left end of the printed matter and closely adjacent the fastening tape 372, the right hand edge of which lies to the left of the margin with which the printed matter starts.

As the ninth step, the slitter and slitter guide are now removed.

For the tenth step the right margin of the composite sheet 370 of FIGURE 6 is lifted and the blade 70 is then placed therebeneath upon the top surface 18.

Figure 7:
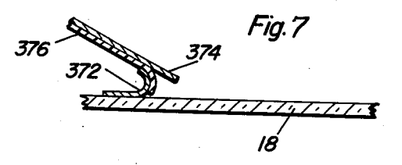
FIGURE 7 shows the initiation of the step of removing the original backing, the composite sheet being lifted about its secured left edge.
Figure 8:
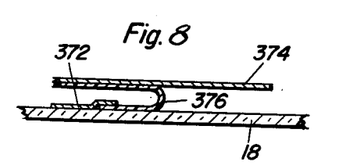
FIGURE 8, similar to FIGURE 7, shows the completing of the step of stripping the original backing sheet from the composite sheet of either FIGURES 1 or 4.

As the eleventh step of the process, the right edge of the composite sheet is lifted, the sheet being swung or folded about its left edge secured by the tape 372 until, as shown in FIGURE 7 the left edge of the bottom sheet 374 is exposed where it may be grasped and pulled to the right as viewed in FIGURES 7 and 23, thereby stripping the backing sheet 374 from the slitted stretchable sheet 376. It will be observed that the backing sheet is completely removed from beneath the slitted stretchable sheet except for the bonding of the same more securely to the right margin of the latter by differentially acting fastening means such as the adhesive coating 328 of relatively greater strength as in FIGURE 1, or the sewed or taped margin 338 of FIGURE 4. Upon the completion of this operation, the strips of the stretchable sheet will now lie in their original position but directly upon the face of the stretching plate 18, being still secured to the latter by the tape 372 at the left margin and being joined to each other by the still attached adhesive or other securing means at their right margin which continues to secure their right ends to the backing sheet.

The twelfth step of the method consists of positioning the slitted sheet 376 upon the top surface 18 with the slits in registration with the guide lines 22 thereof and with the right margin of the stretchable sheet and the right ends of the strips between the slits lightly resting on the adhesive coating 94 of the blade 70 to thereby lightly hold the right portions of the strips in position, with the right margin of the stretchable sheet lying across the guide plate 88 and the guide channel or slot 90 therein. This is the position shown in FIGURE 9.

Figure 9:
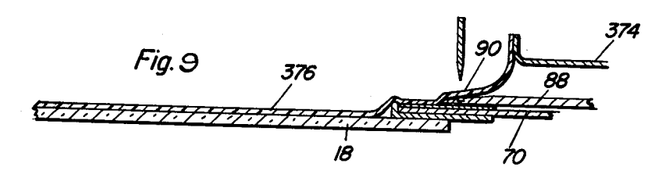
FIGURE 9 is a view sequential to FIGURE 8 and showing the backing sheet stripped from the composite sheet of FIGURES 1 or 4, the stretchable sheet being disposed upon the blade and arm assembly in readiness for severing the right hand end therefrom.

For the thirteenth step of the process the right ends of the strips are severed from the right margin of the stretchable sheet 376 and from the backing sheet 374 still attached thereto, a razor blade or knife being run along or in the guide groove and channel 90 of the guide plate 88 for this purpose. This operation is depicted in FIGURE 9. Upon the completion of this operation, the backing sheet and the still attached right marginal portion of the stretchable sheet are discarded and are of no further use.

An alternative to step thirteen would be to employ a composite sheet having its right-hand edge falling approximately along the line of the above-mentioned channel 90. This sheet would have a differential adhesive area similar to that shown at 328 in FIGURE 1 approximately along its right-hand edge, but the adhesive in this case—while being stronger than the over-all strippable bonding means 326—would still be sufficiently weak to permit the entire backing sheet to be pulled away without any undue premature stretching of the stretchable strips after the strips have been lightly attached to the adhesive coating 94.

It will be particularly observed in FIGURE 9 that the right ends of the strips between the slits are lightly secured to the tacky top surface of coating 94 on the edge portion of the blade 70, the remainder of this tacky surface being covered by the edge of the strip 102 that is in turn covered by the guide plate 88 with its guide channel 90.

As a fourteenth step in the method, the guide plate 88 is now removed.

For the fifteenth step, the wire guide 46 is now returned to position above the right hand end portions of the strips.

Figure 10:
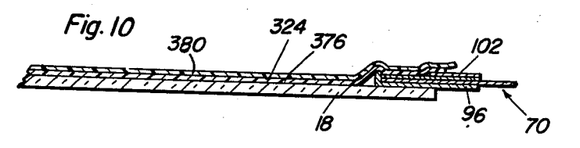
FIGURE 10 is a view sequential to FIGURE 9 and showing the justified ends of the strips of the stretchable sheet secured to the blade and arm assembly and with the transparent cover sheet applied thereto.
Figure 11:
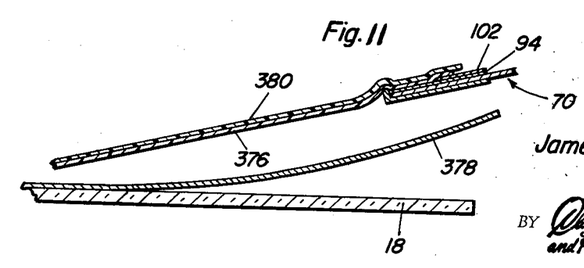
FIGURE 11 is a further sequential view showing the lifting of the sheet of FIGURE 10 by the blade and arm assembly to facilitate the placing of the final backing sheet therebeneath.

As the sixteenth step, a stretching assembly is now brought into operation and by manipulation of the same in the manner set forth in section III of this specification under the heading Stretching Assembly, the right end of each of the strips is individually stretched until the printed matter thereon is caused to register with the wire guide 46. As each strip is stretched, it is then passed firmly down upon the tacky surface previously mentioned upon the top of the blade 70, this being the position shown in FIGURE 10. It will be noted that whereas the right ends of the strips were only lightly secured to a portion of the surface 94 for the severing operation shown in FIGURE 9 and referred to under step thirteen, in order to permit easy removal of the right ends of the strip in order to justify the same, upon the completion of this step, as shown in FIGURE 10, a much more firm attachment of the right ends of the strips to the tacky surface 94 upon the blade 70 is now effected in order to hold them under tension in their stretched condition.

As the seventeenth step, the wire guide 46 is again pivoted out of the way.

Thereafter, for the eighteenth step, a final transparent cover sheet is applied to the top of the justified strips. This transparent cover sheet may be the same as the sheet 348 discussed in connection with FIGURE 3 and which is shown in FIGURE 2 in the three-unit article.

In applying this final transparent cover sheet, it will be observed that the right end of the latter is caused to overlie and overlap the edge of the large blade.

As the nineteenth step, the final transparent cover sheet is pressed firmly and evenly into uniform contact with the overall top surface of the stretched strips.

As the twentieth step, the blade 70 is lifted by being pivoted upwardly with its support arms thereby lifting the right ends of the justified strips which are secured thereto and also the final transparent cover sheet which holds the strips securely together in parallel, justified relationship to one another.

As the twenty-first step, a final backing sheet, indicated by the numeral 378, and which may comprise the final backing sheet shown at 344 in FIGURE 3 and discussed in connection with the three-unit sheet of FIGURE 2 is then slid beneath the raised justified strips, adhesive-side-up.

As the twenty-second step, the blade 70, together with the raised strips and transparent cover sheet, is lowered upon the backing sheet.

As the twenty-third step, the justified strips, already united by the transparent cover sheet, are pressed firmly and evenly into contact with the adhesive coating of the final backing sheet.

As the twenty-fourth step of the method, the tape 372 is removed releasing the left end of the final composite justified sheet.

Or, alternatively, the left hand edge of the final composite, justified sheet may be cut loose by running a cutting instrument, such as a razor blade, in contact with the surface and between the tape 372 and the left hand margin of the lines of type.

As a twenty-fifth step, the right end of the composite sheet is removed from the blade 70.

As the final and twenty-sixth step, the final composite justified sheet is trimmed at its edges into the desired final size and the method is completed.

The same method is applied when a pre-slitted composite sheet is employed, except that steps 7, 8 and 9 are omitted since they merely constitute the forming of the slits in the unslitted typewritten composite sheet.

Certain alternative method steps, together with various kinds of auxiliary apparatus, can be envisioned in connection with the step of attaching the type composite sheet to the stretching surface 18, or its equivalent.

One such arrangement would call for the use of a backing sheet having a perforated, scored or cut line therein extending vertically of the sheet and slightly to the left of the left-hand margin of the typed or printed matter on the stretchable sheet. The portion of the composite sheet to the left of this line could be held in a V-shaped clamp having the juncture or apex of its jaws in close proximity to the stretching surface 18. Such a clamp could be made movable from left to right (or vice versa) to accommodate composite sheets of varying column widths and would be employed to hold the left-hand ends of the stretchable strips and also hold the slight portion of the backing sheet to the left of the perforated, scored, or cut line in close relation to the stretching surface 18. The main portion of the backing sheet would then be torn away starting at the perforated, scored or cut line and the stretching process would then be carried out in the same manner as that previously described.

Another alternate arrangement would be to employ an auxiliary taping device which would apply an overlapping strip of adhesive tape of the proper length to the left-hand edge of the composite sheet to simplify the step of affixing the sheet to the stretching surface 18. Also, a double-duty machine of this type could be constructed which would simultaneously tape both the left-hand and right-hand edges of the composite sheet. However, the right-hand tape would preferably be folded over so as to stick to the backing as well as to the stretchable sheet. This would make possible the use with the apparatus described of a more simple laminated sheet having a single over-all bonding means, rather than the differential type of bonding such as that illustrated in FIGURE 1, since the tape binding at the right-hand edge of the composite sheet would function in the same manner as the more permanent bonding means 328 of FIGURE 1.

An additional refinement which might also be included in such a taping device would be a corrugating or notch-tearing means which would impress a series of short, closely-spaced tears or stretched areas into the composite sheet along its left-hand edge at approximately the same time at which the overlapping tape is applied. These stretched or torn areas would have the effect of insuring that the stretchable sheet would be torn loose from the backing sheet all along the extreme left-hand edge of the composite sheet, thereby facilitating the removal of the over-all backing sheet and making it practically impossible for individual line strips to be pulled out of context by having them stick to the backing as the latter is removed rather than to the tap which is supposed to hold them at their left-hand ends to the stretching surface 18. The loosening effect produced by this corrugating or notching means when applied to a composite sheet of the present invention is explained by the fact that this type-receiving sheet will stretch as the backing sheet is torn. This introduces a sliding movement in the contact zone between the stretching type-receiving and the unstretching backing sheet which fractures the bond between them. After the edges of the two sheets have been separated in this manner, removal of the rest of the backing sheet is merely a matter of completing the "peeling" action which has already been started.

The apparatus illustrated and heretofore described in this specification is designed for use with typing machines of various kinds which are presently in widespread use. It was originally created primarily for use for use in medium or relatively small-sized printing operations. However, it is believed that it could be made to compete satisfactory in its present form against raised-type composing machines (such as Linotype or Monotype) even in very large-scale production of printed matter. If such use of the present apparatus were to become an accomplished fact, there would undoubtedly be considerable demand for a more highly mechanized version thereof. For this reason, it seems desirable to point out here that such as version of the apparatus, using the same general method and materials, seems highly feasible. The most likely over-all form which such as arrangement would take would probably be as follows:

The composite laminated sheet would be fed onto the typewriter platen in roll form in either pre-slit or unslit condition. After being typed upon, the composite sheet would be peeled apart, probably by feeding the stretchable and non-stretchable parts thereof into opposing rollers. The parts of the stretchable sheet corresponding to successive lines of type would then pass on to a set of gripping means which would grip the sheet at the ends of the lines thereof. In the case of an unslit sheet a cutter, probably of the guillotine type, would sever the sheet one line at a time. The gripping means would then stretch the line-strip the requisite amount and carry it forward a short distance to a point where it would be gripped by two opposing converging surfaces over which the transparent cover sheet and the final backing sheet (both supplied in roll form) were being simultaneously drawn from different directions with their adhesively-coated surfaces facing one another. The justified stretched strips would thus be sandwiched one-at-a-time into the final three-way composite sheet to be photographed. The amount which the gripping means would stretch each strip could be determined either by having the gripping means keyed to the spacing mechanism of the typewriter so as to add sufficient length to each strip to compensate for the difference between the original typed length of the line and a pre-selected column width; or means such as a photo-electric switching device could be employed to stop the stretching operation as soon as light passing through the transparent line-strip or being reflected from its surface were diminished by the relative darkness of the right-hand extremity of the last type-impression on the strip.

The obvious alternatives to the sandwiching operation described in the various embodiment of the present disclosure would be the use singly of either a transparent cover sheet of very high relative stiffness or a similiarly rigid final backing sheet. Both of these vehicles would hold the stretched strips in flat-lying justified condition, but would appear to be more cumbersome than the sandwiching arrangement, since the final justified sheet would be harder to trim to size, or to store or dispose of. Also the materials would probably be more expensive. Nevertheless, it is quite possible that either arrangement would prove superior for certain types of work, and in such cases either one or both of them could be used readily with the other elements of the present invention. They could also be combination for extra rigidity.

It should also be noted that although parts of the prevent disclosure have recited the step of applying the final backing sheet before that of applying the final transparent cover sheet, it is probably more-often-than-not more convenient to apply the transparent cover sheet first, since this locks the stretched line strips in place before they are raised for the purpose of applying the final backing sheet. This minimizes the chances of disarranging the strips in the process of raising them.

It is also possible, however, to visualize a variation of the present apparatus in which the ends of the stretched strips would be held by stationary holding means and a supporting surface then raised upward to support the undersides of the strips during the sandwiching operation. In such a case as this, it would probably be preferable to apply the final backing sheet before applying the transparent cover sheet.

Concerning the three-way laminated sheet of FIGURE 2, it should be noted that where the separator sheet 362 is of some material, such as some kinds of glassine, from which the adhesive of either the transparent cover sheet 348 or the final backing sheet 344 is not easily strippable, it must naturally be treated with a suitable release coating so as to enable these sheets to be readily removed from it. Also, it should be noted that another useful variation of the composite sheet illustrated in FIGURE 17 would be a four-way laminated sheet comprising a composite sheet identical with that of FIGURE 2 but having an additional coating of pressure-sensitive adhesive on the underside of the final backing sheet, a readily peelable cover sheet covering this adhesive, and a non-adhering selvage conveniently located at its margin. This would enable the elements in the sheet to be used in the manner already described and would produce a final justified sandwich-type sheet with an adhesively coated final backing sheet, so that when the peelable cover sheet were removed therefrom, the justified unit could be affixed directly to the surface of the paste-up of which it was intended to become a part.

Concerning the binding tape 338 shown along the right-hand margin of the composite sheet of FIGURE 19, it should be noted that such tape could be applied in various ways. The simplest way would be to attach part of it along its length to the top surface of the stretchable sheet and to bend the remaining, overlapping portion around the edge of the composite sheet and affix it to the back of the backing sheet. Another way would be to have the stretchable sheet terminate slightly to the left of the right-hand edge of the backing sheet and thus have the tape overlap directly onto the top surface of the backing sheet. This arrangement reduces the stiffening effect caused by some kinds of tape when applied to the edge of the composite sheet and is helpful in counteracting the tendency to work out of alignment in the typewriter during the typing process which characterizes sheets having one edge more flexible than the other.

Another feature relating to the use of tape along the right-hand edge of the composite sheet lies in the undercut area 312 of the slitter guide since this recess is intended to give sufficient clearance so that the blade 256 will not rest on the tape during the slitting operation. This enables the blade 256 to lie perfectly flat upon the stretchable top surface of the composite sheet and insures that when the slitter is moved along the blade 256 the blades or knives 182 will cut into the composite sheet to a relatively uniform depth from one end of each slit to the other, thereby producing a perfect series of linestrips. In this connection, it should be noted that the best results are obtained when the knives are adjusted so that they cut completely through the stretchable material but not completely through the non-stretchable material. This insures that the line strips will be completely dissevered from one another and at the same time causes the backing sheet to remain sufficiently unified to facilitate handling of the composite sheet during the operation of removing the backing.

Concerning the tacky surface 94 on the large blade 70 and the non-adhesive strip 102 overlying part of the surface 94, it can be noted that these two elements are formed from a commonly used commercially available double-faced adhesive tape having a plastic skip-slit liner. In the present case, a one-half-inch strip of this tape has been applied to the large blade 70, and the left-hand half of the liner has then been removed. This arrangement exposes just enough adhesive area to hold the stretched strips in an effective manner. When the backing sheet has been completely separated from the line strips, these strips are left with their right hand ends lying side-by-side along the center line of the plastic cover strip 102. This strip has a smooth surface and facilitates the movement of the under jaw of the clamp 130 in sliding under the end of successive line-strips in order to grip them for stretching. And when the line-strips are raised and pulled free from the adhesive surface 94 preparatory to being stretched, the presence of the plastic strip 102 insures that the separation of the linestrips from the adhesive surface will begin in the center of the strip of adhesive tape. This prevents the tape from pulling away from the large blade 70 as would sometimes be the case if removal of the line-strip were initiated (in the absence of the plastic cover strip 102) at the far right-hand edge of the adhesive or tacky tape 94.

As was indicated earlier, the justified line-strips are normally pulled free from the tacky surface 94 once they have been encased in their final cover and backing sheets and are removed from the justifying apparatus. Thus the adhesive tape making up the tacky surface 94 can be used over repeatedly. In normal use, each section of the particular commercially-available tape alluded to above has usually been for about six or eight stretching operations before being replaced.

No discussion of the present invention would be complete without some mention of its relative efficiency in comparison to the most widely used alternative device now obtainable. This device is a relatively slow-printing two-typing composing machine which would normally require almost half-an-hour of a skilled operator's time to complete the second typing, or justifying, operation on a normal-width thirty or forty-line page. A relatively unskilled operator using the present invention could justify the same page in approximately three minutes. Using a pre-slit sheet he could do it in less than two minutes.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A composite sheet for use in justifying typewriting comprising a relatively stiff and non-yielding backing sheet, a stretchable sheet of a relatively transparent material capable of receiving typewriting thereon, means for strippably bonding said stretchable sheet to said backing sheet, means for releasably securing said sheets together at their right hand edges with a relatively stronger bond than that of said means for strippably bonding.

2. The combination of claim 1 wherein said last means consists of a cement coating.

3. The combination of claim 1 wherein said last means consists of a tape embracing the right hand marginal portions of said sheets and being secured thereto.

4. The combination of claim 1 wherein said last means comprises seaming along the right hand edges of said sheets.

5. The combination of claim 1 wherein said releasable securing means consists of an adhesive material applied to the adjacent right hand marginal surfaces of each of said sheets.

6. A blank for use in justifying typewritten matter comprising a pliable transparent relatively incompressible top sheet adapted to constitute a cover sheet for a stretchable sheet capable of receiving clear typewriting thereon for producing justified printed matter, a relatively stiff sheet adapted to form a final backing sheet for a sheet of justified printed matter and an intermediate spacer sheet disposed between and strippably secured to both said cover and backing sheets.

7. The combination of claim 6 wherein said cover and backing sheets each have a coating of a tacky adhesive by which they are strippably secured to said spacer sheet and may be readily separated therefrom for use.

8. The combination of claim 6 wherein a marginal portion of each of said cover and backing sheets and the complementary marginal portion of said spacer sheet have corresponding unsecured areas whereby to initiate separation of said sheets.

9. A composite sheet for use in justifying typewriting comprising a relatively stiff and non-yielding backing sheet, a stretchable sheet of a relatively transparent material capable of receiving typewriting thereon, means for strippably bonding said stretchable sheet to said backing sheet, means for securing said sheets together at their right hand edges with a relatively stronger bond than that of said means for strippably bonding, said stretchable sheet being provided with a plurality of slits in side-by-side relation to define strips of material therebetween, said slits having at least one end thereof terminating in spaced relation to the adjacent marginal edge of said stretchable sheet whereby the last-mentioned ends of the strips and marginal edge are integrally united.

10. A composite sheet for use in justifying typewriting comprising a relatively stiff and non-yielding backing sheet, a stretchable sheet of a relatively transparent material capable of receiving typewriting thereon, means for strippably bonding said stretchable sheet to said backing sheet, means for securing said sheets together at their right hand edges with a relatively stronger bond than that of said means for strippably bonding, said stretchable sheet being provided with a plurality of slits in side-by-side relation to define strips of material therebetween.

11. A justifiable composite typewriter sheet comprising a stretchable transparent top sheet capable of receiving clear typewriting thereon and a backing sheet therefor having a relatively non-yielding surface upon which said top sheet is positioned, a coating of a strippable adhesive detachably bonding said sheets together, means of a relatively greater strength than that of said coating and disposed within the material of at least one of said sheets for securing together the right hand selvages of said sheets, said stretchable sheet being provided with a plurality of slits in side-by-side relation to define strips of material therebetween, said slits having at least one end thereof terminating in spaced relation to the adjacent marginal edge of said stretchable sheet whereby the last-mentioned ends of the strips and marginal edge are integrally united.

12. A justifiable composite typewriter sheet comprising a stretchable transparent top sheet capable of receiving clear typewriting thereon and a backing sheet therefor having a relatively non-yielding surface upon which said top sheet is positioned, a coating of a strippable adhesive detachably bonding said sheets together, means of a relatively greater strength than that of said coating and disposed within the material of at least one of said sheets for securing together the right hand selvages of said sheets, said stretchable sheet being provided with a plurality of slits in side-by-side relation to define strips of material therebetween.

13. A composite sheet for use in justifying typewriting comprising a relatively stiff and non-yielding backing sheet, a stretchable sheet of a relatively transparent material capable of receiving typewriting thereon, means for strippably bonding said stretchable sheet to said backing sheet, means mounted on at least one of said sheets and disposed inwardly of the right hand edge thereof for releasably securing said sheets together at their right hand edges with a relatively stronger bond than that of said means for strippably bonding.

14. A composite sheet for use in justifying typewriting comprising a relatively stiff and non-yielding backing sheet, a stretchable sheet of a relatively transparent material capable of receiving typewriting thereon, means for strippably bonding said stretchable sheet to said backing sheet, means mounted on at least one of said sheets and disposed inwardly of the right hand edge thereof for securing said sheets together at their right hand edges with a relatively stronger bond than that of said means for strippably bonding, said stretchable sheet being provided with a plurality of slits in side-by-side relation to define strips of material therebetween, said slits having at least one end thereof terminating in spaced relation to the adjacent marginal edge of said stretchable sheet whereby the last-mentioned ends of the strips and marginal edge are integrally united.

15. A composite sheet for use in justifying typewriting comprising a relatively stiff and non-yielding backing sheet, a stretchable sheet of a relatively transparent material capable of receiving typewriting thereon, means for strippably bonding said stretchable sheet to said backing sheet, means mounted on at least one of said sheets and disposed inwardly of the right hand edge thereof for securing said sheets together at their right hand edges with a relatively stronger bond that that of said means for strippably bonding, said stretchable sheet being provided with a plurality of slits in side-by-side relation to define strips of material therebetween.

16. A justifiable composite typewriter sheet comprising a stretchable transparent top sheet capable of receiving clear typewriting thereon and a backing sheet therefor having a relatively non-yielding surface upon which said top sheet is positioned, a coating of a strippable adhesive detachably bonding said sheets together, means of a relatively greater strength than that of said coating mounted on at least one of said sheets and disposed inwardly of the right hand edge thereof and being disposed between said sheets for securing together the right hand selvages of said sheets, said stretchable sheet being provided with a plurality of slits in side-by-side relation to define strips of material therebetween, said slits having at least one end thereof terminating in spaced relation to the adjacent marginal edge of said stretchable sheet whereby the last-mentioned ends of the strips and marginal edge are integrally united.

17. A justifiable composite typewriter sheet comprising a stretchable transparent top sheet capable of receiving clear typewriting thereon and a backing sheet therefor having a relatively non-yielding surface upon which said top sheet is positioned, a coating of a strippable adhesive detachably bonding said sheets together, means of a relatively greater strength than that of said coating mounted on at least one of said sheets and disposed inwardly of the right hand edge thereof and being disposed between said sheets for securing together the right hand selvages of said sheets, said stretchable sheet being provided with a plurality of slits in side-of-side relation to define strips of material therebetween.

References Cited in the file of this patent

UNITED STATES PATENTS

| | | |
|---|---|---|
| 791,062 | Wetmore | May 30, 1905 |
| 1,992,017 | Spielvogel | Feb. 19, 1935 |
| 2,017,184 | Riess | Oct. 15, 1935 |
| 2,126,480 | Landsiedel | Aug. 9, 1938 |
| 2,190,188 | Landsiedel | Feb. 13, 1940 |